US006587210B2

(12) United States Patent
Marcus et al.

(10) Patent No.: US 6,587,210 B2
(45) Date of Patent: Jul. 1, 2003

(54) MEASUREMENT METHOD AND APPARATUS OF AN EXTERNAL DIGITAL CAMERA IMAGER ASSEMBLY

(75) Inventors: Michael A. Marcus, Honeoye Falls, NY (US); Eric A. Dilella, Holley, NY (US); Jiann-Rong Lee, Webster, NY (US); Donald R. Lowry, Palmyra, NY (US); Timothy M. Trembley, Albion, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/281,590

(22) Filed: Oct. 28, 2002

(65) Prior Publication Data

US 2003/0063288 A1 Apr. 3, 2003

Related U.S. Application Data

(62) Division of application No. 09/697,808, filed on Oct. 27, 2000, now Pat. No. 6,512,587.

(51) Int. Cl.[7] .................... G01B 11/06; G01N 21/01; H04N 17/06
(52) U.S. Cl. .................... 356/497; 356/244; 348/129; 348/189
(58) Field of Search .................. 348/374, 187, 348/129–130, 189–190; 356/479, 497, 500, 508, 244, 503

(56) References Cited

U.S. PATENT DOCUMENTS

| | | | | |
|---|---|---|---|---|
| 4,402,613 A | * | 9/1983 | Daly et al. | 356/446 |
| 5,440,396 A | * | 8/1995 | Markus et al. | 356/394 |
| 5,757,485 A | * | 5/1998 | Marcus et al. | 356/479 |

* cited by examiner

*Primary Examiner*—Robert H. Kim
*Assistant Examiner*—Krystyna Suchecki
(74) *Attorney, Agent, or Firm*—Stephen H. Shaw

(57) ABSTRACT

A method for determining whether an imager assembly outside of a camera body meets predetermined focus specifications, wherein the imager assembly includes an image sensor and a camera mounting plate having reference features adapted to cooperate with alignment features in the camera body to locate the image sensor at a predetermined focal plane, including the steps of: mounting the imager assembly onto an imager mounting apparatus having equivalent alignment features; and utilizing low-coherence light interferometry to determine whether the image sensor will meet predetermined focus specifications when mounted in a camera body.

11 Claims, 8 Drawing Sheets

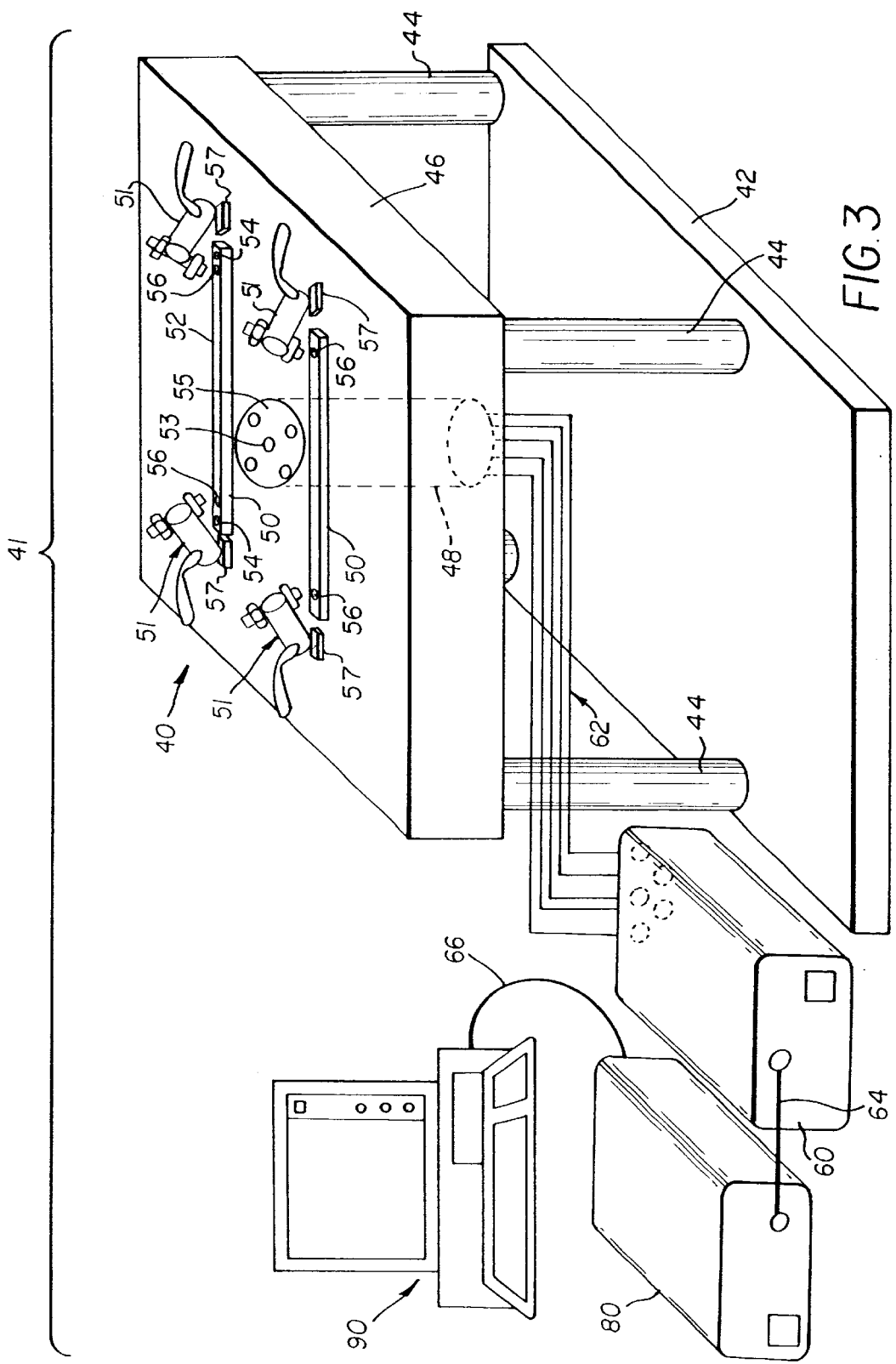

MEASUREMENT METHOD AND APPARATUS OF AN EXTERNAL DIGITAL CAMERA IMAGER ASSEMBLY

CROSS-REFERENCE TO RELATED APPLICATIONS

This is a divisional of application Ser. No. 09/697,808, filed Oct. 27, 2000 (allowed, Sep. 10, 2002).

FIELD OF THE INVENTION

The present invention relates generally to optical interferometry. More particularly, the present invention relates to a method and apparatus for determining the location of an imager plane with respect to a camera-mounting plane of an imager assembly.

BACKGROUND OF THE INVENTION

In a conventional digital camera, an image beam is directed through a lens and onto an imager or image sensor comprised of an array of sensing elements, for example a Charge Coupled Device (CCD). In order to provide a focused image, the lens and the imager need to be properly positioned, relative to each other, within the digital camera.

The steps in a CCD based imager manufacturing process are as follows. Multiple CCD imager arrays are processed together on a single silicon wafer. Imager dies, composed of a single CCD imager array, are diced from the wafer and positioned and glued into specially designed packages. A flat transparent plate called the imager cover glass is then glued into the specially designed package at a location that is offset from the imager die to hermetically seal the specially designed package. This hermetically sealed package containing the imager die is then mounted into a camera-mounting plate that includes a reference plane to facilitate proper mounting into the camera. The camera itself will include a camera reference plane to receive the camera mounting plate from the imager package. In a film camera, film rails usually define the camera reference plane. Optionally, the package can include the camera-mounting plate and reference plane, which would eliminate this last step of mounting the hermetically sealed package into a camera mounting plate.

In order to ensure that the CCD is positioned properly in the camera, the location of the CCD needs to be determined. Such a location can be determined relative to a reference surface or reference plane.

A Coordinate Measuring Machine (CMM) is an example of an apparatus employed to determine the location of an object relative to a reference plane. Conventionally, the object is retained in a suitable holder on an optical bench. In one method to determine the location of an object, three points on a reference plane, approximately 120 degrees apart, are measured to define the reference plane; the coordinates of the three points are tracked in the x, y and z directions. A point on the object is then measured relative to the reference plane, and the distance from the reference plane is calculated. Conventional CMMs have contact probes for intimately contacting each of the points defining the reference plane and the object, such as those described in U.S. Pat. No. 5,428,446 issued Jun. 27, 1995 to Ziegart et al. entitled *Measurement Instrument with Interferometer and Method*, U.S. Pat. No. 5,446,545 issued Aug. 29, 1995 to Taylor entitled *Method of and Apparatus for Calibrating Machines Including a Measuring Probe and a Measuring Apparatus*, and U.S. Pat. No. 4,929,082 issued May 29, 1990 to Webber entitled *Laser Linear Distance Measurement System and Apparatus*. These references include interferometers that monitor the displacement of the machine axes. In contrast, non-contacting methods, such as optical triangulation, are described in U.S. Pat. No. 4,373,804 issued Feb. 15, 1983 to Pryor et al entitled *Method and Apparatus for Electro-Optically Determining the Dimension, Location and Attitude of Objects*, and U.S. Pat. No. 5,510,625 issued Apr. 23, 1996 to Pryor et al. entitled *Method and Apparatus for Electro Optically Determining the Dimension, Location and Attitude of Objects*.

Another technology known as low-coherence light interferometry has also been used to measure physical properties of an object. U.S. Pat. No. 5,659,392 issued Aug. 19, 1997 to Marcus et al. entitled *Associated Dual Interferometric Measurement Apparatus for Determining a Physical Property of an Object*, and U.S. Pat. No. 5,596,409 issued Jan. 21, 1997 to Marcus et al. entitled *Associated Dual Interferometric Measurement Method for Determining a Physical Property of an Object*, disclose an associated dual interferometric apparatus and method for measuring physical properties of an object, such as thickness, group index of refraction, and distance to a surface. U.S. Pat. No. 5,757,485 issued May 26, 1998 to Marcus et al. entitled *Digital Camera Image Sensor Positioning Method Including a Non-Coherent Interferometer*, and U.S. Pat. No. 5,757,486 issued May 26, 1998 to Marcus et al. entitled *Digital Camera Image Sensor Positioning Apparatus Including a Non-Coherent Light Interferometer*, disclose a digital camera image sensor positioning apparatus and method which includes a low-coherence light interferometer. The apparatus and method include a removable optical probe assembly mounted to a digital camera. The low-coherence light interferometer is in communication with the optical probe. assembly to determine a depth of an image sensor residing within a digital camera, relative to a reference surface. U.S. Pat. No. 6,075,601 issued Jun. 13, 2000 to Marcus et al. entitled *Optical Probe Calibration Apparatus and Method* describes an optical probe calibration apparatus used for calibrating the optical probes used in U.S. Pat. Nos. 5,757,485 and 5,757,486 referenced above. These three to the camera reference surface.

Heretofore, a skilled operator was required to install the imager in the camera and subsequently assemble the camera before finding out if the imager was properly focused. Several steps were required, including securing the imager with 3 or 4 screws onto the camera-mounting plane, and inserting a measurement optical probe into the camera body and locking the probe into the lens flange-mounting ring before a measurement could be initiated. Before mounting the measurement optical probe into the camera body, the camera electronics needed to be turned on and the electronic shutter needed to be opened. Full camera assembly and substantial skilled operator intervention were required before an assessment of imager focus could be made. If the imager was out of focus, the camera had to be disassembled and the imager replaced. In order to calibrate the measurement optical probe, an external calibration fixture was also required. The distance from the camera-mounting ring to the reference surface in the external calibration fixture is better suited for measurement with an external technique, such as provided by a CMM machine.

While internal apparatus and methods may have achieved a certain level of success, the internal apparatus is not readily transportable nor simple to use. Further, the methods are time consuming and quite often are dependent on the skill of the operator.

Accordingly, a need continues to exist for an apparatus and method for determining the position of an image sensor in a digital camera. Furthermore, there is a need to properly predict the position of an image sensor before permanently physically mounting the image sensor inside the digital camera. The apparatus needs to be robust, transportable and simple to use. The method must be fast, provide objective results independent of the operator, and provide accurate and consistent results.

SUMMARY OF THE INVENTION

The need is met according to the present invention by providing a method for determining whether an imager assembly outside of a camera body meets predetermined focus specifications, wherein the imager assembly includes an image sensor and a camera mounting plate having reference features adapted to cooperate with alignment features in the camera body to locate the image sensor at a predetermined focal plane, including the steps of: mounting the imager assembly onto an imager mounting apparatus having equivalent alignment features, and utilizing low-coherence light interferometry to determine whether the image sensor will meet predetermined focus specifications when mounted in a camera body.

The present invention also provides an imager mounting apparatus to receive an imager assembly in a predetermined orientation for determining whether an imager assembly outside of a camera body meets predetermined focus specifications, including: an optical probe with a pellicle reference surface; a camera body mounting equivalent with equivalent alignment features for receiving and aligning the imager assembly in a predefined orientation; and a plurality of clamps to lock in the predetermined orientation.

The present invention also provides an interferometric-based measurement system for determining whether an imager assembly outside of a camera body meets predetermined focus specifications, including: a low coherence light interferometer; an imager mounting apparatus including an optical probe having an optical probe chuck; an optical fiber cable for coupling light from the interferometer to the optical probe chuck; and a computer for processing data collected by the interferometer, wherein the data is used to determine whether the imager assembly meets predetermined focus specifications.

The present invention also provides a method for calibrating an absolute distance to a reference surface for determining the position of an imager plane relative to an image sensor camera-mounting reference plane in an imager assembly, including the steps of: mounting a flat reference plate onto an imager mounting reference surface; and utilizing low coherence light interferometry to determine the distance between the imager mounting reference surface and a pellicle reference surface (known as PP') of the imager mounting apparatus.

The present invention also provides a method for determining a position of an imager plane relative to an image sensor camera-mounting plane in an imager assembly, including the steps of: temporarily mounting the imager assembly onto an imager mounting apparatus having an imager mounting reference surface such that the imager sensor camera-mounting reference plane and the imager mounting reference surface are in intimate contact; wherein the imager mounting apparatus includes an optical probe with a pellicle reference surface in a predetermined orientation with respect to the imager mounting reference surface such that the pellicle reference surface is disposed at a first depth relative to the imager mounting reference surface; utilizing low-coherence light interferometry to determine: (i) a second depth from the pellicle reference surface to a front surface of the optically transparent plate, (ii) an optical thickness of the imager cover glass, and (iii) a third depth from a back surface of the imager cover glass to the imager plane; and calculating the optical position of the imager plane relative to the imager sensor camera-mounting reference plane.

BRIEF DESCRIPTION OF THE DRAWINGS

FIG. 3 shows a schematic of an example measurement apparatus;

DETAILED DESCRIPTION OF THE INVENTION

A stationary probe apparatus, referred herein as an imager mounting apparatus, has been developed which includes an optical probe permanently mounted at a constant distance from a reference plane designed to mimic the function of the imager mounting plane in a digital camera. The optical probe has a pellicle reference plane built in to it which is used as a reference surface to calculate distances. Preferably, the pellicle reference plane is the surface of a thick, glass, optical flat that faces the imager assembly in the probe mount. This allows one to assess the imager focus location with respect to an ideal focus, without the need of inserting the optical probe into a camera body. The stationary fixture, with the permanently mounted optical probe, also secures the imager mounting plate in place with a simple clamping means, thus eliminating the need to use screws which add to assembly time. In order to calibrate the apparatus an optically flat plate is installed into the same apparatus to determine the distance from the optical probe pellicle reference plane to the plane in the same apparatus that the imager mounting plate is clamped to. Thus, no external apparatus is needed to calibrate the optical probe.

Figure 1A:
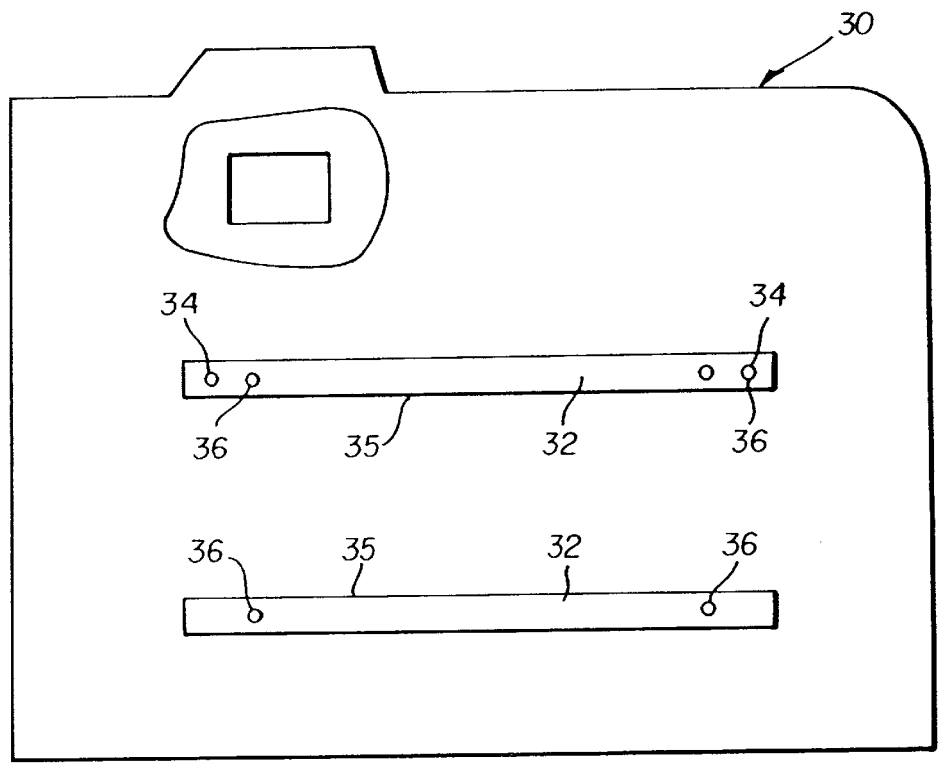
FIG. 1A shows a prior art schematic back view of a camera body including a camera mounting reference surface.

FIG. 1A shows a prior art schematic back view of a camera body 30 with a camera mounting reference structure 35 with a camera reference plane 32 for mounting an imager assembly (not shown). In a film camera the camera reference structure 35 ordinarily includes a pair of camera film rails. Also shown in FIG. 1A are the camera threaded holes 36 and the camera alignment pin receiver holes 34 in the camera reference structure 35 for mounting the imager assembly. Preferably, one of the camera alignment pin receiver holes 34 is slotted in order to facilitate mounting of an imager assembly to the camera body.

Figure 1B:
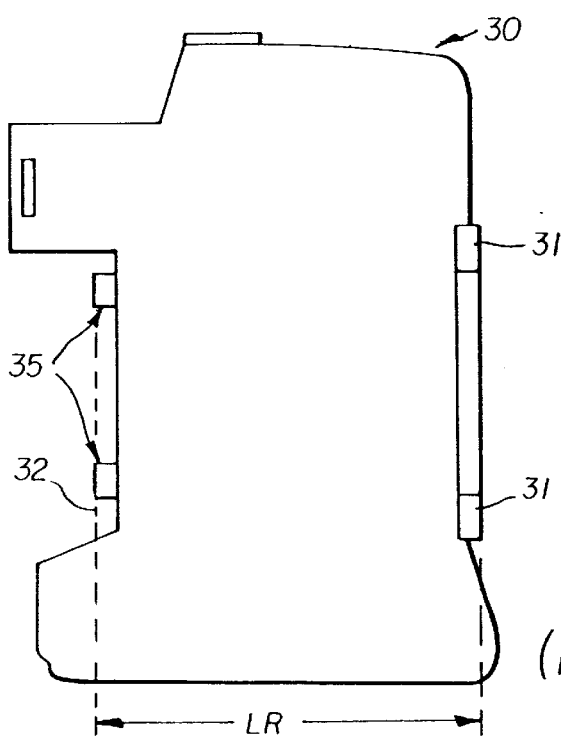
FIG. 1B shows a prior art schematic side view of a camera body with a camera mounting reference surface and a lens flange mounting ring for attaching a lens to the camera body.

FIG. 1B shows a prior art schematic side view of a camera body 30 with a camera mounting reference structure 35 with camera reference plane 32 and a lens flange mounting ring 31 for mounting camera lenses to the camera body. The distance from the lens flange mounting ring 31 to the camera reference plane 32 is defined as LR.

In order to properly focus an imager when mounted into a camera body it must be located at a defined distance from the lens flange mounting ring within a design tolerance. In the manufacture of precision cameras such as SLR cameras the distance LR is tightly controlled so that proper focus can be assessed by determining the distance from the camera reference plane 32 to the position of an imager die in an imager assembly.

Figure 2A:
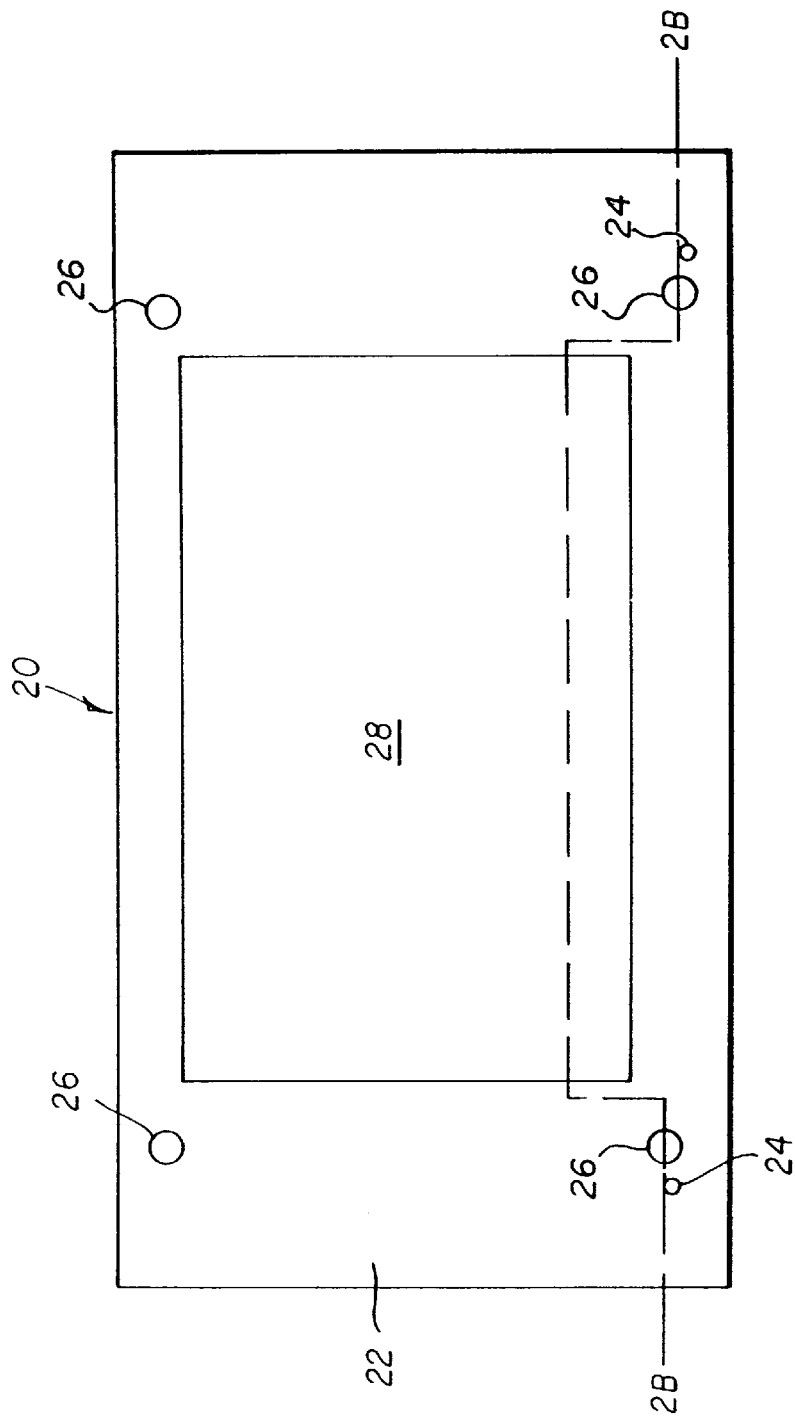
FIG. 2A shows a prior art plan view of an example camera mounting plate.

FIG. 2A shows a plan view of a prior art camera mounting plate 20 disclosing the reference features adapted to cooperate with alignment features in the camera 30 of FIGS. 1A and 1B, and that enables positioning an image sensor 12 (shown in FIG. 2B) at a predetermined focal plane once mounted inside the camera 30. Usually the predetermined focal plane is measured with respect to the lens flange-mounting ring 31 (shown in FIG. 1B) of the camera body 30. FIG. 2A shows a camera mounting plate 20, mounting holes 26, alignment pins 24 and an image sensor cutout 28.

Figure 2B:
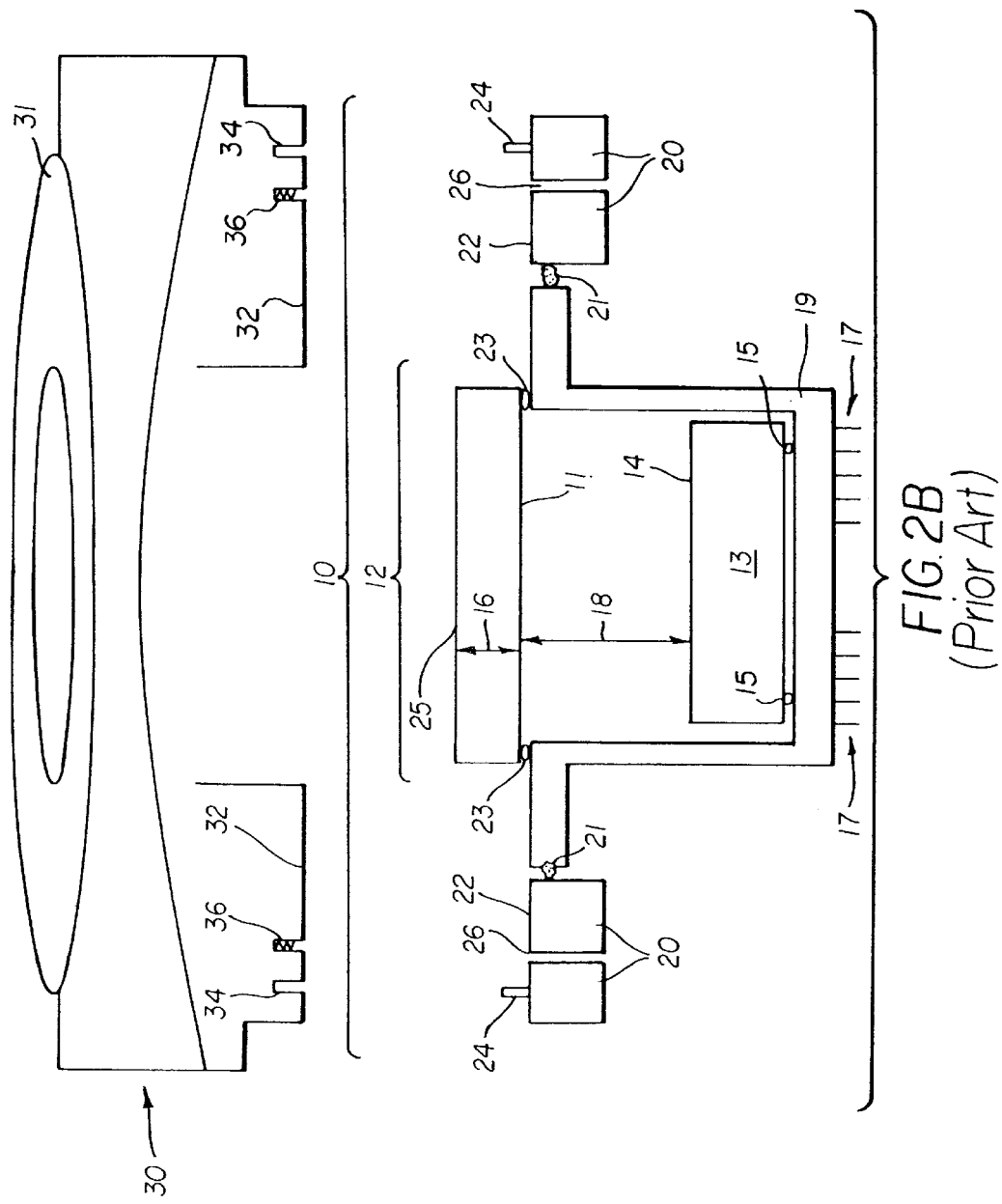
FIG. 2B shows a prior art cross-section view of an imager assembly including an image sensor and parts of a camera body to indicate the orientation of imager mounting into a camera body.

FIG. 2B shows a prior art cross-section view of an imager assembly 10 including an image sensor 12 and parts of a camera body 30 to indicate the orientation of imager mounting into a camera body. The cross-section view shown in FIG. 2B is that shown by the dashed line in FIG. 2A and labeled 2B. An imager assembly 10, shown schematically in FIG. 2B, includes an image sensor 12 mounted to a camera-mounting plate 20 which includes reference features adapted to cooperate with alignment features in the camera 30 which facilitate locating the image sensor 12 at a predetermined focal plane. These reference features include an image sensor camera-mounting reference plane 22, alignment pins 24 and a plurality of mounting holes 26 to facilitate proper mounting into the camera 30. During assembly the image sensor 12 is attached to the camera mounting plate 20 by bonding means 21. The lens flange-mounting ring 31 is also shown in FIG. 2B to show orientation of the camera body.

Also shown in FIG. 2B, is the camera reference plane 32 that is aligned with the image sensor camera mounting plate reference plane 22 during the imager assembly's 10 installation into the camera 30. Alignment pins 24 are installed in camera alignment pin receiver holes 34 which cause mounting holes 26 to automatically align with camera threaded holes 36. The imager assembly 10 is secured to the camera 30 with screws (not shown) placed in the camera mounting plate 20 which pass through mounting holes 26 and are threaded into the camera threaded holes 36.

The image sensor 12 includes an imager die 13 with an imager plane 14, offset from an optically transparent imager cover glass 16 with front surface 25 and back surface 11 defining an imager gap 18 between the imager plane 14 and the back surface of the imager cover glass 16. The imager cover glass 16 can be mounted in an imager package 19 with a hermetic seal at the cover glass bond perimeter 23 around the imager die 13. The image sensor 12 also includes imager electrical connections 17 on the bottom edge of the imager package 19. The imager die 13 is glued to the imager package 19 at the imager die 13 to package bond locations 15.

During the assembly process the image sensor 12 is bonded to the camera mounting plate 20 in a predetermined orientation using bonding means 21. This bonding is preferably performed with epoxy. The imager focus position can then be preferably tested with the method and apparatus of this invention before curing the epoxy. If the imager position meets predetermined specifications the epoxy will then be cured. If the position does not meet predetermined specifications, the position will be adjusted before curing the epoxy.

FIG. 3 shows a schematic of the measurement apparatus 41 including an optical interferometer 80, a computer 90, with A–D converters and data acquisition and control capability for passing interferometer control parameters and collecting interferometric data through data transmission cables 66 from the interferometer 80 to the data acquisition boards in computer 90, an optical multiplexer 60 and an imager mounting apparatus 40. The imager mounting apparatus 40 includes a primary base 42 which preferably sits on any table, main vertical standoffs 44 which fasten to the primary base 42 and base adapter 46, an optical probe 48 mounted to the base adapter 46; a camera body mounting equivalent 50 having equivalent alignment features to a camera body including an imager mounting reference surface 52 attached to the base adapter 46, with alignment holes 54 to receive alignment pins 24 from the imager mounting plate 20. For a film camera the camera body mounting equivalent 50 is designed to mimic the film rails in the camera. The optical probe 48 also includes individual optical probe chucks 53 and an optical probe pellicle reference plane 55. A plurality of holes 56 are also included in the camera body mounting equivalent 50 to match the locations of the threaded screw holes 36 in a camera to align with alignment holes 26 in the imager mounting plate 20 of imager assembly 10. FIG. 3 also shows a plurality of toggle clamps 51 and clamp bases 57 that are attached to the base adapter 46 and are used to secure the imager assembly 10. The imager assembly 10 is mounted in the imager mounting apparatus 40 in place during the measurement.

During a measurement, light from a low-coherence source (not shown) inside the interferometer 80 is sent to the optical multiplexer 60 by interferometer single mode fiber cable 64. The optical multiplexer is used to switch between different measurement locations on the imager surface. This is done by switching the optical connection inside the multiplexer 60 between the various single mode optical fibers 62 attached to the back of optical multiplexer 60 which are coupled to the individual optical probe chucks 53 of optical probe 48 which define the individual measurement locations on the surface of the imager 12. During a measurement sequence each of the optical probe chuck locations 53 are measured and analyzed in a defined sequence.

The optical probe 48 is defined as having a pellicle reference plane 55. The preferred pellicle reference plane 55 is the surface of a thick, glass, optical flat that faces the imager assembly 10 when mounted in the imager mounting apparatus 40.

Figure 4A:
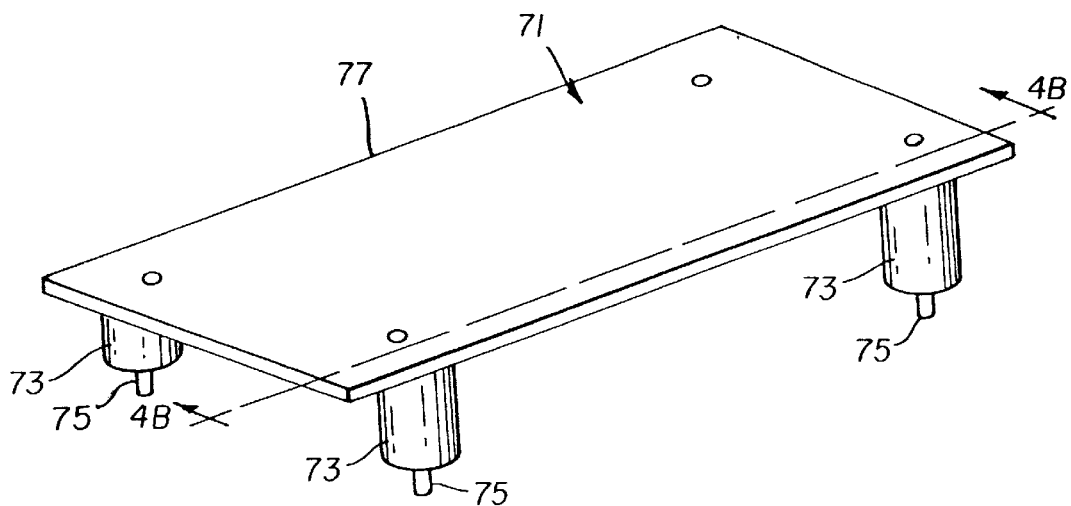
FIG. 4A shows a schematic of an example clamp table assembly.

Referring to FIG. 4A, in one embodiment, a removable clamp table assembly 77 is preferably used to secure the imager assembly 10 to the imager mounting apparatus 40 utilizing the plurality of toggle clamps 51 (see FIG. 3). The removable clamp table assembly 77 includes a table top 71, a plurality of clamp table standoffs 73 each with its own standoff alignment pin 75. Standoff alignment pins 75 are located at points to correspond with the imager mounting holes 54 in the camera mounting plate 20 of the imager assembly 10 used for mounting in the camera 30.

Figure 4B:
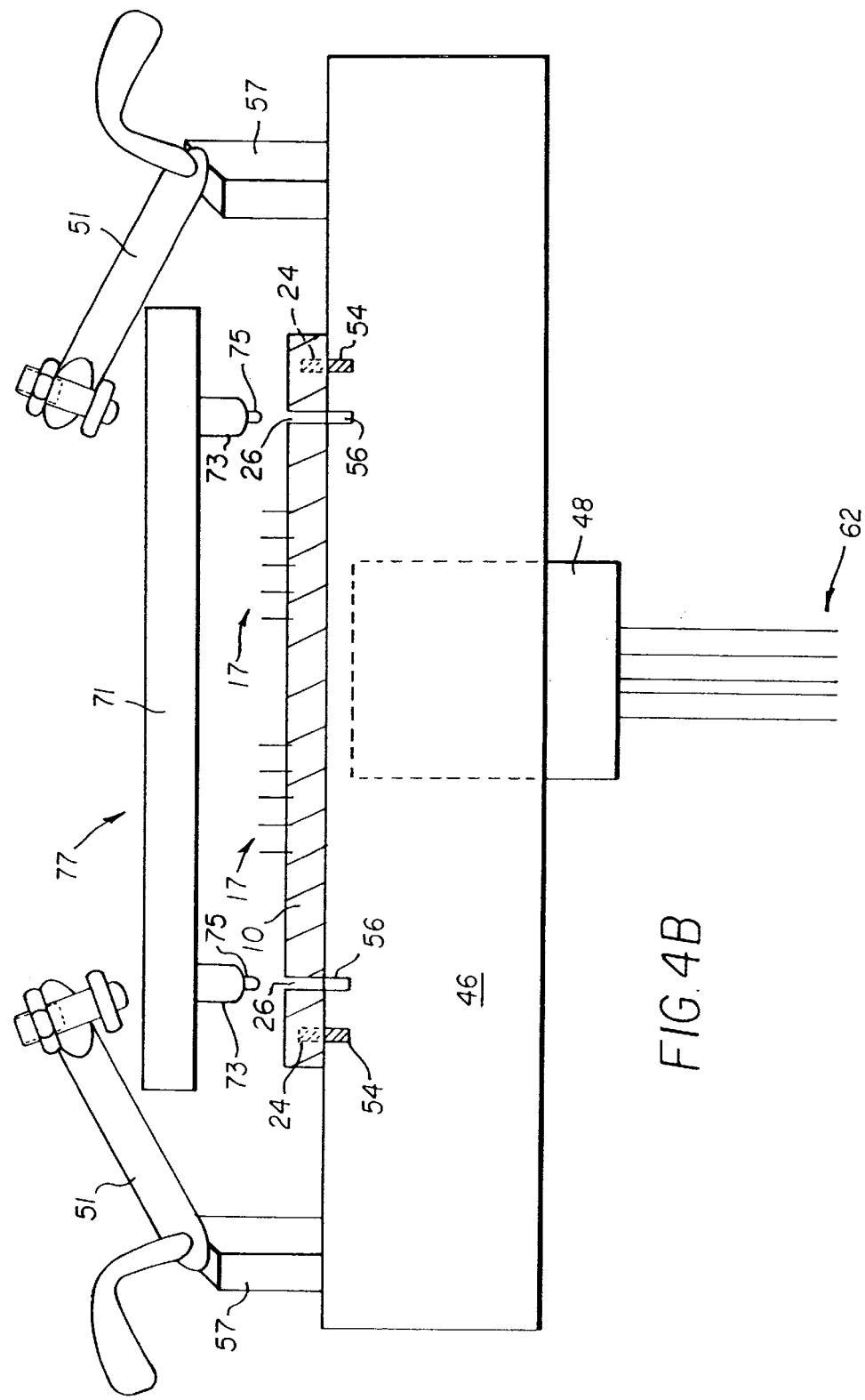
FIG. 4B shows a cross-section view of an example clamp table assembly in relation to the imager assembly.

FIG. 4B shows a cross-section view of the imager assembly 10 geometry when mounted for measurement purposes in the imager mounting apparatus 40. The cross-section view is indicated by the dashed line in FIG. 4A and labeled 4B. The optical probe 48 is on the bottom facing up looking through the base adapter 46, and the imager assembly 10 is placed face down in the camera body mounting equivalent 50 (shown in FIG. 3), and positioned on the top surface of the base adapter 46, so that alignment pins 24 of the imager assembly 10 fit into alignment holes 54 of the camera body mounting equivalent 50, mounting holes 26 in the imager assembly 10 are aligned with the holes 56 of the camera body mounting equivalent 50. When the alignment is complete the active area of the image sensor 12 faces the optical probe 48. The clamp table 77 is then positioned on top of the imager assembly 10 so that the standoff alignment pins 75 fit in the mounting holes 26 of the imager assembly 10. The toggle clamps 51 are subsequently toggled to their contact position so that the clamp load is distributed over the imager assembly 10 at the positions of the mounting holes 26. A clamping force is applied which mimics the loading that the imager assembly 10 would have when screws are inserted into the mounting holes and threaded into a camera body 30.

Figure 5B:
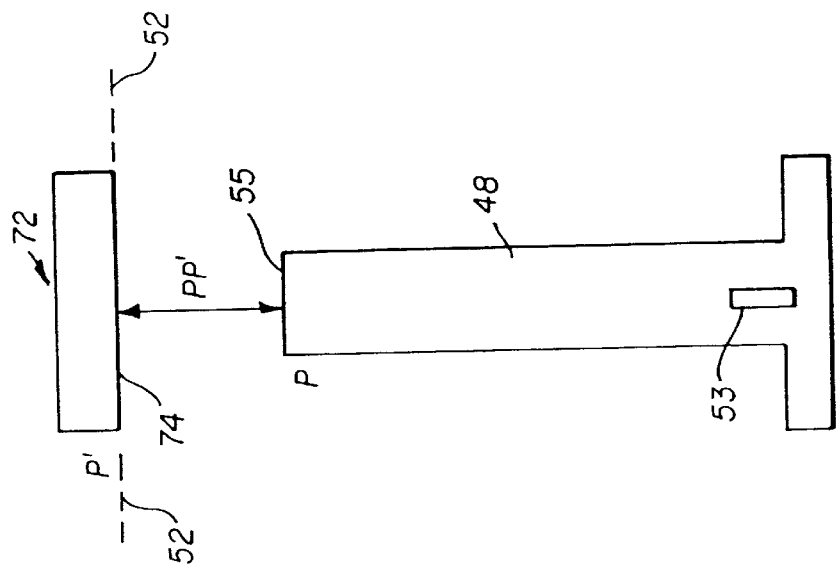
FIGS. 5A and 5B show relational measurement geometry and the corresponding parameters which are measured utilizing one embodiment of the present invention.
Figure 5A:
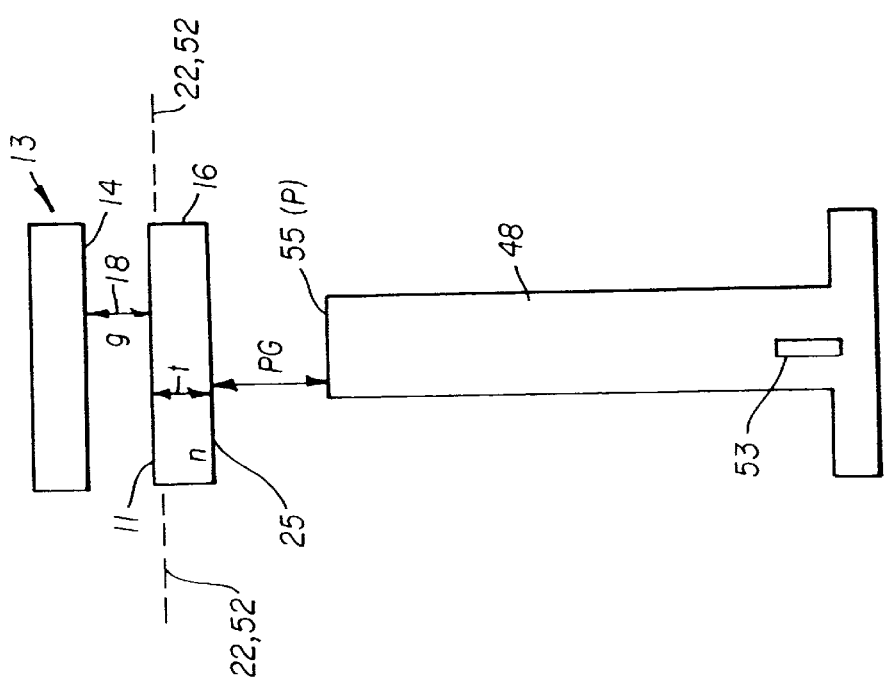

FIGS. 5A and 5B show a schematic of the measurement geometry and the parameters measured with an interferometric based measurement system. FIG. 5A shows the measurement of the image sensor 12 while FIG. 5B shows the measurement of a reference plate used to calibrate the measurement system. Shown in FIGS. 5A and 5B are the optical probe 48, an optical probe chuck 53, the pellicle reference surface 55, and the imager mounting reference plane 52. FIG. 5A also shows the locations of the relevant imager assembly 10 components, including the imager die 13 with imager plane 14 and the imager cover glass 16, with front surface 25 and back surface 11 and the image sensor camera mounting reference plane 22. When the imager assembly 10 is mounted into the imager mounting apparatus 40 the imager mounting reference plane 52 and the image sensor camera mounting reference plane 22 are coincident in space. The distance PG is defined as the distance from the pellicle reference plane 55 to the front surface 25 of the imager cover glass 16. The distance 'g' is defined as the distance between the imager plane 14 and the back surface 11 of the imager cover glass 16. The thickness of the imager cover glass is defined as 't'. During a measurement, the optical thickness of the imager cover glass (nt) is measured with the interferometer 80, where 'n' is the group index of refraction of the imager cover glass 16.

In order to locate the height of the imager plane with respect to the image sensor camera mounting reference plane 22, the distance from the pellicle reference plane 55 to the imager mounting reference plane 52 in the imager mounting apparatus is measured, since these two planes are coincident during the measurement. The measurement is performed by mounting a flat reference plate 72 with flat reference plane 74 as shown in FIG. 5B onto the imager mounting reference plane 52. The flat reference plane 74 is coincident with the imager mounting reference plane 52 and the image sensor camera mounting reference plane 22. The distance between the optical probe pellicle reference plane 55 and the flat reference plane 74 is defined as PP' which is equivalent to the distance between the pellicle reference plane 55 and the imager mounting reference plane 52. Thus a measurement performed using the flat reference plate 72 is used as a calibration to determine the parameters PP' for each of the optical probe chuck locations.

The objective of the measurement is to determine the position of the imager plane 14 with respect to the image sensor mounting plane 22. Comparing this to specification limits for focus, when mounted inside a camera 30, a determination can be made if the camera 30 will be in focus when the imager assembly 10 is mounted inside the camera 30. In performing the calculation it is desired to measure the effective optical distance between the imager plane 14 and the imager sensor mounting plane 22 which we call the die-to-plate distance (DP). The presence of the imager cover glass increases the effective focal distance of a lens by an amount $\Delta_G$ given by the relationship $\Delta_G = t(1-1/n)$ where t is the thickness of the imager cover glass (16) and n is the group index of refraction of the cover glass at the wavelength of the light source used in the interferometer. The physical die to plate distance (DP)p is given by $$(DP)_P = PG + g + t - PP'. \quad (1)$$

In the digital camera application we are interested in the effective optical die to plate distance DP which is equal to $$DP = (DP)_P + \Delta_G = PG + g + (nt)/(n)^2 - PP' \quad (2)$$

where PG is the distance from the pellicle reference plane 55 the front surface 25 of the imager cover glass 16, 'g' is the gap between the imager plane 14 and the back surface 11 of the imager cover glass 16, 'n' is the group index of refraction of the imager cover glass, 't' is the thickness of the imager cover glass, $\Delta_G$ is the focus distance increase due to the presence of the imager cover glass 16 and PP' is the distance between the pellicle reference plane 55 and the imager mounting reference surface 52 at the probe chuck 53 measurement location. PP' is measured by installing a flat reference plate 72 at the measurement location. The flat reference plate preferably includes a plurality of holes to mate to the alignment pins 75 of the removable clamp table assembly 71.

Note that no externally measured parameters are required in order to determine the die to plate spacing. This is a drastic improvement compared to the internal camera measurements made in the prior art which require an external measurement such as a CMM measurement of a reference cradle to provide a reference distance required for determining imager focus error in a camera or film rail locations.

Figure 6:
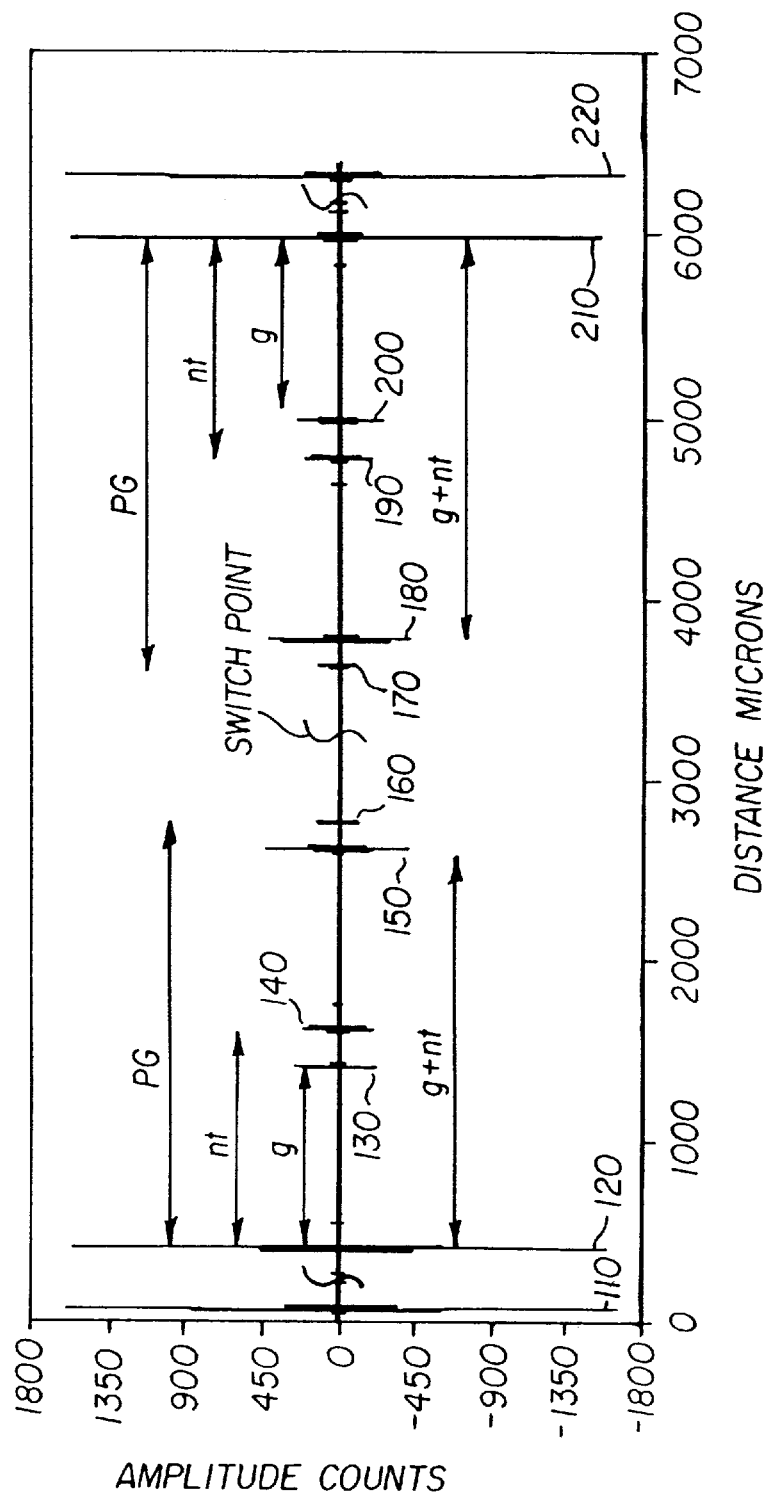
FIG. 6 shows an example of raw interferometer measurement data obtained when measuring an imager assembly mounted into the imager mounting apparatus.

FIG. 6 shows an example of raw interferometer measurement data obtained when measuring an imager assembly mounted into the imager mounting apparatus. During the measurement the interferometer is made to scan a distance large enough to measure the relevant distances g, nt and PG. The data is obtained using an interferometer operating in an autocorrelation geometry. An example of an interferometer operating in an autocorrelation geometry is shown in FIG. 11 of U.S. Pat. No. 5,757,486 referenced above. The interferometer continually scans back and forth a distance greater than the largest measured distance PG and is made to cross the zero-crossing point in the interferometer, the position at which the path lengths of the 2 arms of the Michelson interferometer are equal in length. Motor scan reversal points are shown in FIG. 6 as the curved lines. Peaks 110, 120, 210 and 220 are zero crossings of the interferometer and all measured distances are referenced to the nearest adjacent zero crossings. The interferometer trace segment shown in FIG. 6 correspond to one complete interferometer motor scan cycle plus passing again across the zero crossing points. The interferometer motor reverses scan directions between pairs of peaks 110 and 120, 160 and 170 and 210 and 220.

The imager gap 'g' is determined by measuring the distance between peaks 120 and 130 and/or 200 and 210, the optical thickness nt of the imager cover glass 16 is determined by measuring the distance between peaks 120 and 140 and and/or 190 and 210, and the pellicle gap (PG) is determined by measuring the distance between peaks 120 and 160 and/or 170 and 210. The distance between peaks 120 and 150 and or peaks 180 and 210 define the distance g+nt. During a measurement usually a set interval of time, such as, 1 second is used to repetitively scan the interferometer back and forth at a typical rate such as 10 Hz. This allows 20 measurements per second, and an average value of the measurements would be stored in a computer file. Interferometer peak locations are determined by the methods of the references. Suitable peak location calculation procedures are described in U.S. Pat. Nos. 5,596,409 and 5,659,392 referenced above.

PARTS LIST 10 imager assembly
11 imager cover glass back surface
12 image sensor
13 imager die
14 imager plane
15 imager die to package bond locations
16 imager cover glass
17 imager electrical connections
18 imager gap
19 imager package
20 camera mounting plate
21 bonding means
22 image sensor camera mounting reference plane
23 cover glass bond perimeter
24 alignment pins
25 imager cover glass front surface
26 mounting holes
28 image sensor cutout
30 camera body
31 lens flange-mounting ring
32 camera reference plane
34 camera alignment pin receiver holes
35 camera mounting reference structure
36 camera threaded holes
40 imager mounting apparatus
41 measurement apparatus
42 primary base
44 main vertical standoff
46 base adapter
48 optical probe
50 camera body mounting equivalent
51 toggle clamps
52 imager mounting reference surface
53 optical probe chucks
54 alignment holes
55 optical probe pellicle reference plane
56 holes
57 clamp base
60 optical multiplexer
62 single mode optical fibers
64 interferometer single mode fiber cable
66 data transmission cables
71 table top
72 flat reference plate
73 clamp table standoff
74 flat reference plane
75 standoff alignment pins
77 clamp table assembly
80 optical interferometer
90 computer
110 peaks
120 peaks
130 peaks
140 peaks
150 peaks
160 peaks
170 peaks
180 peaks
190 peaks
200 peaks
210 peaks
220 peaks

What is claimed is:

1. An imager mounting apparatus to receive an imager assembly in a predetermined orientation for determining whether an imager assembly outside of a camera body meets predetermined focus specifications, comprising:
    a) an optical probe with a pellicle reference surface;
    b) a camera body mounting equivalent with equivalent alignment features for receiving and aligning the imager assembly in a predefined orientation; and
    c) a plurality of clamps to lock in the predetermined orientation.

2. The imager mounting apparatus claimed in claim 1, wherein the camera body mounting equivalent further comprises:
    an imager mounting reference surface having a plurality of alignment holes for receiving alignment pins from an imager mounting plate on the imager assembly.

3. The imager mounting apparatus claimed in claim 1, further comprising:
    a) a primary base;
    b) main vertical standoffs fixably related to the primary base; and
    c) a base adapter for holding and attaching the camera body mounting equivalent to the main vertical standoffs and for holding the optical probe in a defined orientation.

4. The imager mounting apparatus claimed in claim 3, further comprising a removable clamp table assembly securably attached to the imager assembly with clamping means, and including:
    a) a table top;
    b) a plurality of clamp table standoffs for supporting the table top; and
    c) a plurality of clamp table alignment pins each associated with each clamp table standoff.

5. The imager mounting apparatus claimed in claim 1, wherein the optical probe with a pellicle reference surface further comprises a plurality of individual optical probe chucks.

6. A interferometric-based measurement system for determining whether an imager assembly outside of a camera body meets predetermined focus specifications, comprising:
    a) a low coherence light interferometer;
    b) an imager mounting apparatus including an optical probe having an optical probe chuck;
    c) an optical fiber cable for coupling light from the interferometer to the optical probe chuck; and
    d) a computer for processing data collected by the interferometer, wherein the data is used to determine whether the imager assembly meets predetermined focus specifications.

7. The interferometric-based measurement system claimed in claim 6, and wherein the imager mounting apparatus further comprises:

a) an optical probe with a pellicle reference surface
b) a camera body mounting equivalent with equivalent alignment features for receiving and aligning the imager assembly in a predefined orientation; and
c) a plurality of clamps to lock in the predetermined orientation.

8. The interferometric-based measurement system claimed in claim 6, wherein the optical fiber cable is input to an optical multiplexer, wherein an output from the optical multiplexer is coupled to each optical probe chuck.

9. The interferometric-based measurement system claimed in claim 7, wherein the imager mounting apparatus further includes:
 a clamp table assembly for distributing a load when holding a camera mounting plate, including a plurality of standoffs each with its own standoff alignment pin placed in intimate contact with a camera mounting plate, such that the standoff alignment pins are coincident with a plurality of camera mounting holes in the camera mounting plate.

10. The interferometric-based measurement system claimed in claim 7, wherein the plurality of clamps provides a clamping force which mimics a loading that the imager assembly would have when a set of screws are inserted into a plurality of mounting holes and threaded into the camera body.

11. The apparatus claimed in claim 1, further comprising:
 a low coherence light interferometer to determine the position of an imager plane with respect to an image sensor mounting plane of the imager assembly.

* * * * *